US008561070B2

(12) United States Patent
Bohrer et al.

(10) Patent No.: US 8,561,070 B2
(45) Date of Patent: Oct. 15, 2013

(54) CREATING A THREAD OF EXECUTION IN A COMPUTER PROCESSOR WITHOUT OPERATING SYSTEM INTERVENTION

(75) Inventors: Patrick J. Bohrer, Cedar Park, TX (US); Ahmed Gheith, Austin, TX (US); James L. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 12/959,075

(22) Filed: Dec. 2, 2010

(65) Prior Publication Data
US 2012/0144396 A1 Jun. 7, 2012

(51) Int. Cl.
*G06F 9/46* (2006.01)

(52) U.S. Cl.
USPC .......................................... 718/100; 718/102

(58) Field of Classification Search
USPC .................................. 718/100, 102
See application file for complete search history.

(56) References Cited

U.S. PATENT DOCUMENTS

| 6,848,097 | B1 | 1/2005 | Alverson et al. | |
|---|---|---|---|---|
| 7,243,345 | B2 * | 7/2007 | Ohsawa et al. | 717/149 |
| 7,395,409 | B2 * | 7/2008 | Dowling | 712/34 |
| 7,398,521 | B2 * | 7/2008 | Hoflehner et al. | 717/151 |
| 7,418,585 | B2 * | 8/2008 | Kissell | 712/244 |
| 7,424,599 | B2 * | 9/2008 | Kissell et al. | 712/228 |
| 7,594,236 | B2 | 9/2009 | Jiang et al. | |
| 7,610,473 | B2 * | 10/2009 | Kissell | 712/235 |
| 7,676,664 | B2 * | 3/2010 | Kissell | 712/244 |
| 7,725,697 | B2 * | 5/2010 | Kissell | 712/244 |
| 7,765,547 | B2 * | 7/2010 | Cismas et al. | 718/100 |
| 8,028,152 | B2 * | 9/2011 | Glew | 712/220 |
| 8,230,423 | B2 * | 7/2012 | Frigo et al. | 718/102 |
| 8,245,081 | B2 * | 8/2012 | Colbert et al. | 714/38.1 |
| 2002/0199179 | A1 * | 12/2002 | Lavery et al. | 717/158 |
| 2003/0014473 | A1 * | 1/2003 | Ohsawa et al. | 709/107 |
| 2007/0106988 | A1 * | 5/2007 | Kissell | 718/102 |
| 2007/0106990 | A1 * | 5/2007 | Kissell | 718/102 |
| 2007/0283357 | A1 * | 12/2007 | Jeter et al. | 718/102 |
| 2011/0197090 | A1 * | 8/2011 | Colbert et al. | 714/2 |

FOREIGN PATENT DOCUMENTS

WO WO 2006/074027 A2 7/2006

* cited by examiner

*Primary Examiner* — Van Nguyen
(74) *Attorney, Agent, or Firm* — DeLizio Gilliam, PLLC (57) ABSTRACT

Creating a thread of execution in a computer processor includes an apparatus for copying data from a first set of registers to a second set of registers. The first set of registers is associated with a parent hardware thread and the second set of registers is associated with a child hardware thread. The copying is indicated by a hardware processor opcode called by a user-level process. The copying is performed with no operating system involvement. The child hardware thread is in a wait state. Creating the thread also includes changing, as indicated by the hardware processor opcode, the child hardware thread from the wait state to an ephemeral run state. The ephemeral run state indicates a lack of operating system support structures for the child hardware thread.

14 Claims, 7 Drawing Sheets

CREATING A THREAD OF EXECUTION IN A COMPUTER PROCESSOR WITHOUT OPERATING SYSTEM INTERVENTION

BACKGROUND OF THE INVENTION

1. Field of the Invention

The field of the invention is data processing, or, more specifically, methods, apparatus, and products for creating a thread of execution in a computer processor.

2. Description Of Related Art

In current computer architecture, execution of software applications is carried out with processes that contain any number of software threads of execution. Software threads of execution are executed in hardware threads on a computer processor. Software threads of execution are administered—created, scheduled, maintained, and retired—by an operating system. A process many contain hundreds or even thousands of software threads. Administering large numbers of software threads, however, requires an extremely large operational overhead for an operating system. Current implementations of thread creation, for example, are often inefficient.

SUMMARY

Apparatus, and products are disclosed for creating a thread of execution in a computer processor. In embodiments of the present invention, creating a thread of execution in a computer processor includes copying, as indicated by a hardware processor opcode called by a user-level process, data from a first set of registers to a second set of registers, wherein the first set of registers is associated with a parent hardware thread. The first set of registers is associated with a parent hardware thread and the second set of registers is associated with a child hardware thread. The first set of registers and the second set of registers are located on the computer processor. The child hardware thread is in a wait state. Creating a thread of execution in a computer processor also includes changing, as indicated by the hardware processor opcode, the child hardware thread from the wait state to an ephemeral run state. The ephemeral run state indicates a lack of operating system support structures for the child hardware thread.

DETAILED DESCRIPTION OF EXEMPLARY EMBODIMENTS

Figure 1:
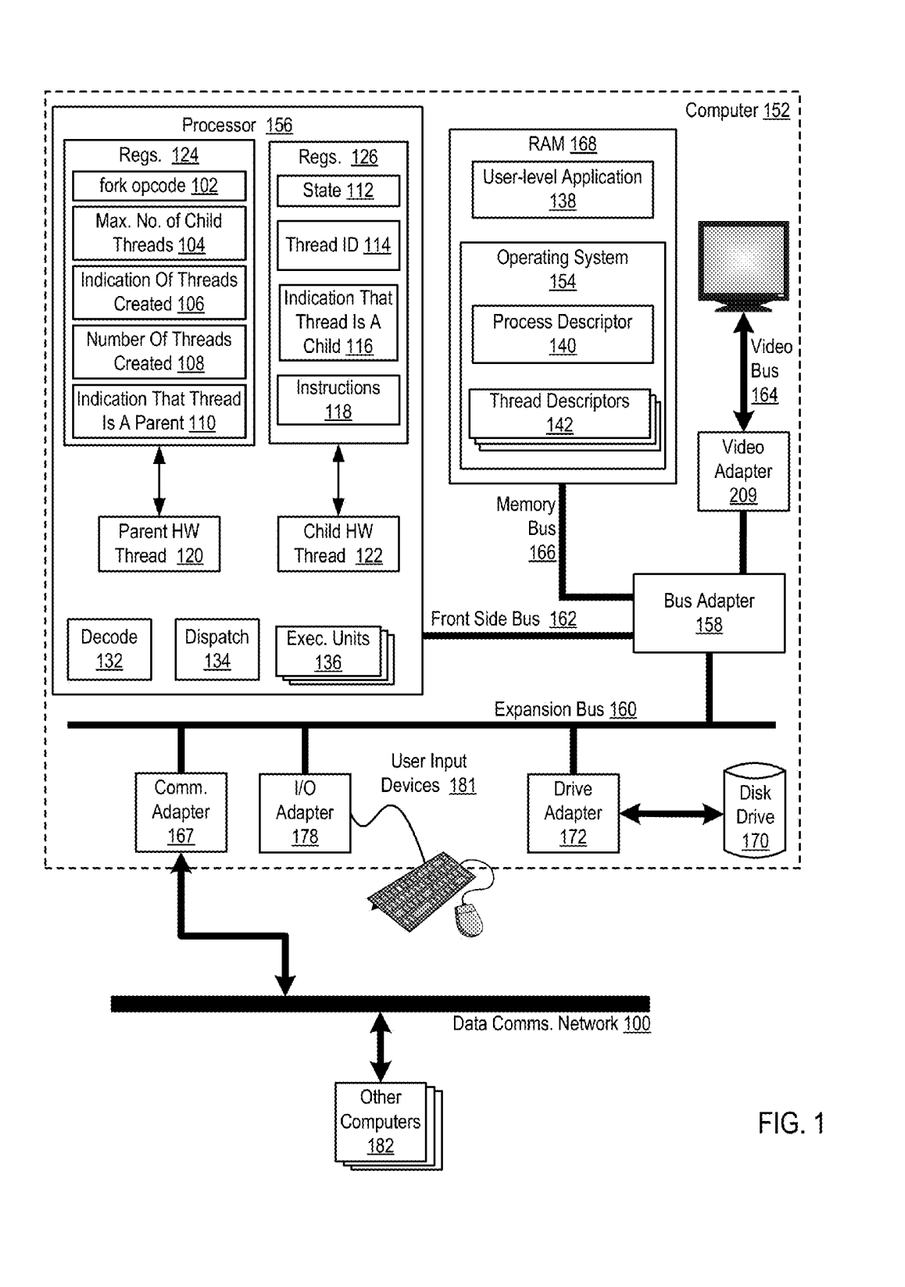
FIG. 1 sets forth a block diagram of an example computer system in which a thread of execution is created in a computer processor according to embodiments of the present invention.

Exemplary methods, apparatus, and products for creating a thread of execution in a computer processor in accordance with the present invention are described with reference to the accompanying drawings, beginning with FIG. 1. FIG. 1 sets forth a block diagram of an example system in which a thread of execution is created in a computer processor according to embodiments of the present invention. A thread of execution, also referred to in this specification as a 'software thread,' is the smallest unit of processing that can be scheduled by an operating system for execution on a processor. A thread is typically contained inside a process. Multiple threads can exist within the same process and share resources such as memory, while different processes do not share these resources. In particular, the threads of a process share the process's instructions and context—values variables have at any given moment in execution. A 'hardware' thread, by contrast, is implemented in hardware of a computer processor and executes instructions of software threads. That is, support for a hardware thread is built into the processor itself in the form of a separate architectural register set for each hardware thread, so that each hardware thread can execute simultaneously with no need for context switches among the hardware threads. Each such hardware thread can run multiple software threads of execution implemented with the software threads assigned to portions of processor time called 'quanta' or 'time slots' and context switches that save the contents of a set of architectural registers for a software thread during periods when that software thread loses possession of its assigned hardware thread.

The system of FIG. 1 includes an example computer (152), automated computing machinery, configured to carry out thread creation in a computer processor in accordance with embodiments of the present invention. The computer (152) of FIG. 1 includes at least one computer processor (156) or 'CPU' as well as random access memory (168) (RAM') which is connected through a high speed memory bus (166) and bus adapter (158) to processor (156) and to other components of the computer (152).

Stored in RAM (168) of the example computer (152) are a user-level application (138) and an operating system (154). A user-level application is a module of computer program instructions that carries out user-level data processing tasks. Examples of such applications include word processing applications, spreadsheet applications, database management applications, media library applications, multimedia editing applications, and others as will occur to readers of skill in the art. Applications are described as 'user-level' to distinguish them from a 'system-level' or 'kernel-level' process, such as the operating system (154) stored in RAM (168). Typically, in prior art, execution of user-level applications are supported by a system-level process: in executing a user-level application an operating system, for example, may instantiate a process, assign a process identifier to the process, assign a virtual address space to the process, instantiate one or more software threads of execution within the process, assign thread identifiers to each of the software threads, schedule the software threads for execution on the computer processor, manage memory paging among user-level processes and software threads, and so on as will occur to readers of skill in the art. Also, once instantiated, a user-level process of the prior art may create additional threads through system calls to the operating system. Each such system call, results in a time and resource consuming process. In this way, user-level applications may be described as operating 'above' or 'on top of' a system-level application. Examples of operating systems useful in computers in which threads of execution are created in a computer processor according to embodiments of the present invention include UNIX™, Linux™, Microsoft XP™, AIX™, IBM's i5/OS™, and others as will occur to those of skill in the art. The user-level application (138), and operating system (154) in the example of FIG. 1 are shown in RAM (168), but many components of such software typically are stored in non-volatile memory also, such as, for example, on a disk drive (170).

In the example of FIG. 1, the operating system (154) has created a process descriptor (140) that describes the process for the user-level application (138). The process descriptor (140) may specify a process identifier, an address space assigned to the process, a status of resources allocated to a process, a status of the process, a copy of processor registers to reinstate upon a context switch in which the process is restored, and so on as will occur to readers of skill in the art. The operating system (154) in the example of FIG. 1 has also instantiated a number of software threads, specified by thread descriptors (142) stored in RAM (168). Thread descriptors may specify a thread identifier, an address space assigned to the process within which the thread is contained, a status of resources allocated to the process within which the thread is contained, a status of the thread, a copy of processor registers to reinstate upon a context switch in which the thread is restored, and so on as will occur to readers of skill in the art.

The software threads in the example of FIG. 1 for the user-level application (138) are scheduled to execute within hardware threads (120, 122) implemented in the processor (156). That is, computer program instructions forming a thread of the user-level application (138) are executed within a hardware thread. Computer program instructions may be executed within a hardware thread through use of an instruction decoder (132), an instruction dispatcher (134), and execution units (136). An instruction decoder (132) is a network of static and dynamic logic within the processor (156) that retrieves instructions (118) from registers in the register sets (124, 126) and decodes the instructions into microinstructions for execution on execution units (136) within the processor. An instruction to be decoded for execution, for example may include an opcode (operation code). An opcode is the portion of a machine language instruction that specifies the operation to be performed. Apart from the opcode itself, an instruction may also have one or more parameters, also called operands, on which the operation should act, although some operations may have implicit operands, or none at all. Depending on the architecture of the processor upon which the opcode is decoded and executed, the operands may be register values, values in a call stack, other memory values, I/O ports, and the like. Once decoded, Execution units (136) execute the microinstructions. Examples of execution units include LOAD execution units, STORE execution units, floating point execution units, execution units for integer arithmetic and logical operations, and so on. The computer processor (156) in the example of FIG. 1 also includes an instruction dispatcher (134) that arbitrates, in the presence of resource contention, priorities for dispatch of instructions from the hardware threads (120, 122) of execution. The instruction dispatcher (136) is a network of static and dynamic logic within the processor (156) that dispatches microinstructions to the execution units (136) in the processor (156).

The processor (156) in the example system of FIG. 1, operates generally for creating a thread of execution by copying, by a hardware processor opcode called by a user-level process—in FIG. 1, the process implemented for the user-level application (138) described by the process descriptor (140)—with no operating system (154) involvement, register contents (118) from a parent hardware thread (120) to a child hardware thread (122). At the time the hardware processor opcode copies the register contents (118) from the parent hardware thread (120) to the child hardware thread (122), the child hardware thread (122) is in a wait state (112). After copying the register contents, the hardware processor opcode (102), then changes the child hardware thread from the wait state (112) to an ephemeral run state (112). The hardware processor opcode (102) is described here as creating a thread of execution in a computer processor in accordance with embodiments of the present invention in that the opcode is executed by the processor and the processor carries out actions specified by the opcode.

In the example of FIG. 1, the hardware processor opcode called by the user-level process (138) is a fork opcode (102) that includes an operand specifying a maximum number (104) of child hardware threads to change from the wait state to the ephemeral run state, a location in which to store a number (108) of child hardware threads changed from the wait state to the ephemeral run state, a flag for the processor to set in executing the opcode which indicates (106) whether any child hardware threads were changed from the wait state to the ephemeral run state, and a flag for the processor to set in executing the opcode that identifies (110) the parent hardware thread as a parent (rather than a child hardware thread). In a similar manner, in changing the child hardware thread (122) from the wait state (112) to the ephemeral run state (112), the hardware processor opcode (102) may also set, for the child hardware thread (122), a flag identifying (116) the child hardware thread as a child and assign, by the hardware processor opcode, a unique thread identifier (114) to the child hardware thread including storing an integer in the a register of the child hardware thread. In the example of FIG. 1, a 'flag' may be implemented in various ways including for example, as a value stored in a particular register, as one or more bits in a well-known location, such as a condition code register of the hardware thread, or in other ways as will occur to readers of skill in the art.

The 'state' of the child hardware thread (122) in the example of FIG. 1, is depicted as a value in a register (126) associated with the child hardware thread. A hardware thread as implemented in accordance with embodiments of the present invention, and as described in greater detail with respect to FIG. 2, below, may be set in one of three states: a run state, a wait state, and an ephemeral run state. When in a run state, a hardware thread has full operating system support—a thread descriptor and other system-level support, for example. That is, when a hardware thread is in the run state, the operating system has full knowledge of the hardware thread, its existence and operation. In a wait state, the operating system has knowledge of the hardware thread's existence, but the hardware thread is inactive from the perspective of the operating system. A hardware thread in the wait state is not executing instructions of a software thread. When in the wait state, a hardware thread may be changed to an ephemeral run state without operating system support and may begin to execute instructions. That is, without the operating system instantiating a canonical thread descriptor for the hardware thread, the hardware thread, once in the ephemeral run state may execute software thread instructions. The ephemeral run state is described as 'ephemeral' in that a hardware thread executing in the ephemeral run state may (but is not required to) complete execution and return to the wait state, never once using operating system support.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for creating a thread of execution in a computer processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for creating a thread of execution in a computer processor according to embodiments of the present invention include modems for wired dial-up communications, Ethernet (IEEE 802.3) adapters for wired data communications network communications, and 802.11 adapters for wireless data communications network communications.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
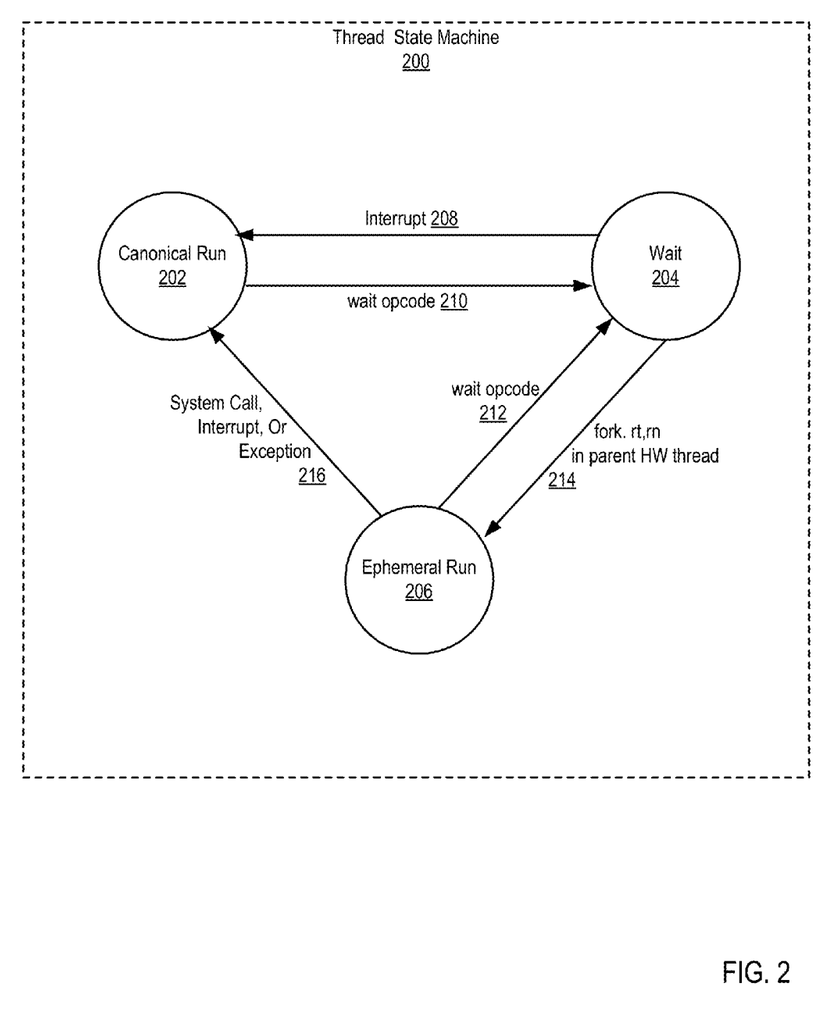
FIG. 2 sets forth an example state machine for a thread of execution in a computer processor in accordance with embodiments of the present invention.

For further explanation, FIG. 2 sets forth an example state machine for a thread of execution in a computer processor in accordance with embodiments of the present invention. The example state machine (200) of FIG. 2 includes three states: a canonical run state (202), a wait state (204), and an ephemeral run state (206). Any hardware thread of a computer processor implemented and configured in accordance with embodiments of the present invention may, at any time, be in one of these three states. The state of a hardware thread may be represented by a value stored in a register associated with the hardware thread and in other ways as will occur to readers of skill in the art. Upon each change in a hardware thread's state, the value stored in the register is also changed to correspond with the hardware thread's current state.

In the run state (202), a hardware thread has full operating system support—a canonical thread descriptor. That is, when a hardware thread is in the run state (202), the operating system has full knowledge of the hardware thread, its existence and operation. Software threads of execution are executed in the hardware thread as scheduled by the operating system, with context switches and time slices. A software thread executing a hardware thread in the run state (202) may cause the hardware thread (202) to enter a wait state by calling 'wait' opcode (210)—a machine instruction that when executed by the processor causes the processor to change a hardware thread's state from the run state (202) to the wait state (204).

In the wait state (204), the operating system has knowledge of the hardware thread's existence, but the hardware thread is inactive from the perspective of the operating system. A hardware thread in the wait state is not executing instructions of a software thread. A hardware thread may return from the wait state upon an interrupt (208) thereby invoking an interrupt handler of the operating system. Alternatively, a user-level process executing in another hardware thread (referred to as a parent hardware thread here) may execute a hardware processor opcode—fork. rt,rn (214), for example—copying with no operating system involvement, register contents from parent hardware thread to the hardware thread in the wait state (204) and change, by the hardware processor opcode, the hardware thread from the wait state (204) to an ephemeral run state (206). The hardware thread changed from the wait state (204) to the ephemeral run state (206) is referred to now as a child hardware thread. In this example, 'ft' and 'rn' are parameters of the fork opcode (214) that specify a number of threads actually created and maximum number of child threads to create.

In the ephemeral run state (206), the child hardware thread may execute instructions copied from the register of the parent hardware thread. If the child hardware thread completes execution of the instructions, the child hardware may return to the wait state (204)—again, without operating system involvement. That is, instruction executing in the child hardware thread may include the previously described wait opcode (212) which will cause the processor to change the state of the child hardware thread from the ephemeral run state (206) to the wait state (204). In this way, a child hardware thread may run to completion without the operating system having any knowledge of the child hardware thread's operation.

From time to time, however, the child hardware thread may need operating system support, or the child hardware thread may be required for use by the operating system for some other task. For example, a child hardware thread in the ephemeral run state (206) may call an operating system function, the processor may receive an asynchronous interrupt of the child hardware thread, thereby invoking an interrupt handler of the operating system, or the child hardware thread may cause an execution exception thereby invoking an interrupt handler of the operating system (216), and so on as will occur to readers of skill in the art. In each such case, the operating system then creates, a canonical operating system thread descriptor for the child hardware thread and the child hardware thread returns to the run (202) state. The operating system may create the child's canonical operating system thread descriptor from another operating system thread descriptor, such as the a thread descriptor of the user-level process, or a thread descriptor of a software thread executing in the parent hardware thread.

Figure 3:
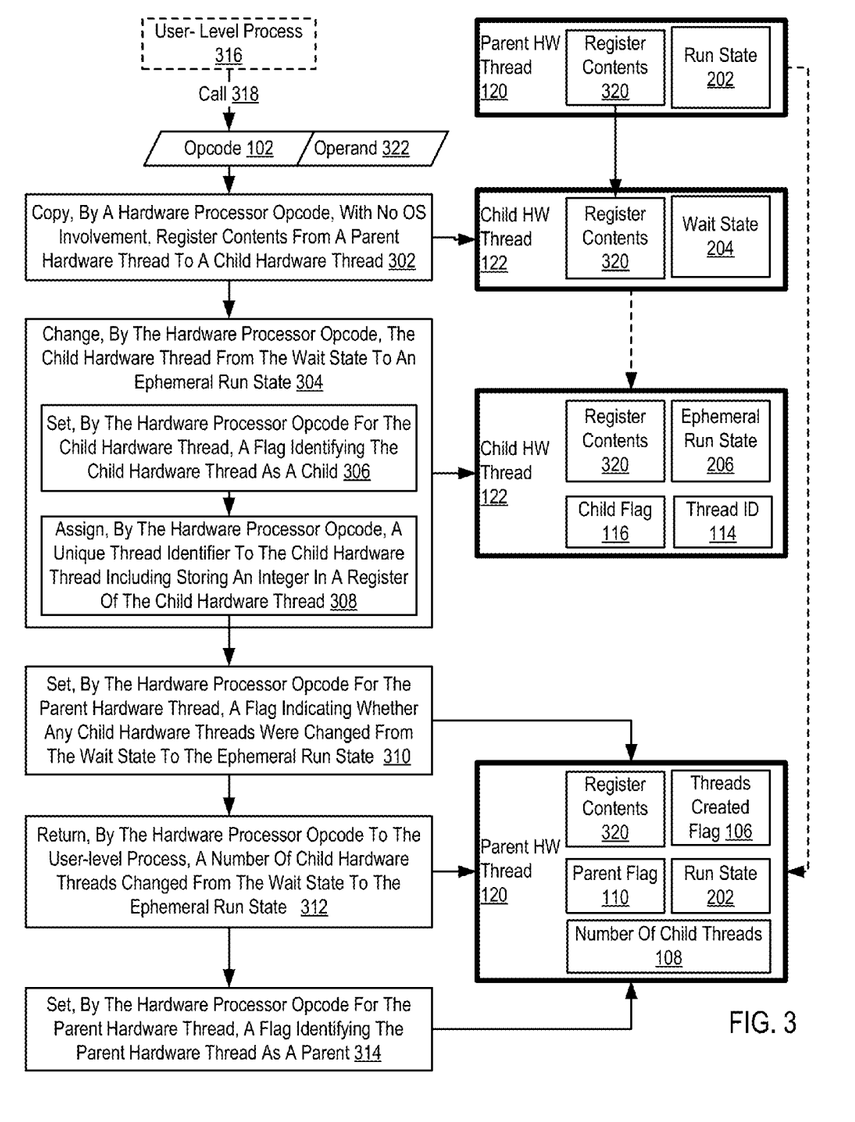
FIG. 3 sets forth a flow chart illustrating an exemplary method for creating a thread of execution in a computer processor according to embodiments of the present invention.

For further explanation, FIG. 3 sets forth a flow chart illustrating an exemplary method for creating a thread of execution in a computer processor according to embodiments of the present invention. The method of FIG. 3 includes copying (302), by a hardware processor opcode (102) called (318) by a user-level process (316), with no operating system involvement, register contents (320) from a parent hardware thread (120) to a child hardware thread (122). In the method of FIG. 3, at the time the hardware process opcode (102) is called (318) by a user-level process, the child hardware thread (122) is in a wait state (204). Copying (302) register contents may includes copying the parent hardware threads architectural registers, instructions stored in the registers, variable values, instruction counter value, and so on as will occur to readers of skill in the art.

The method of FIG. 3 also includes changing (304), by the hardware processor opcode (102), the child hardware thread (122) from the wait state (204) to an ephemeral run state (206). Changing (304) the child hardware thread (122) from the wait state (204) to an ephemeral run state (206) may be carried out in various ways including, for example, by a setting a pre-designated flag, flipping a bit in a well-known location, or storing a predefined value in a register designated for storing state information. In the method of FIG. 3, changing (304), by the hardware processor opcode (102), the child hardware thread (122) from the wait state (204) to an ephemeral run state (206) includes setting (306), by the hardware processor opcode (102) for the child hardware thread (122), a flag (116) identifying the child hardware thread (122) as a child and assigning (308), by the hardware processor opcode (102), a unique thread identifier (106) to the child hardware thread. Assigning (308) a unique thread identifier (106) to the child hardware thread (122) may be carried out by storing an integer in a register of the child hardware thread.

The method of FIG. 3 also includes setting (310), by the hardware processor opcode (102) for the parent hardware thread (120), a flag (106) indicating whether any child hardware threads (122) were changed from the wait state (204) to the ephemeral run state (206). Setting (310) the flag may be carried out various ways including for example, by flipping a bit in a condition code register designated for such a purpose, by storing a value in a register designated for storing such flag, and in other ways as will occur to readers of skill in the art.

In the method of FIG. 3, the hardware processor opcode (102) also includes an operand (322) specifying a maximum number of child hardware threads to change from the wait state to the ephemeral run state, and the method of FIG. 3 includes returning (312), by the hardware processor opcode (102) to the user-level process (316), a number (108) of child hardware threads (122) changed from the wait state (204) to the ephemeral run state (206). A hardware processor opcode may specify more child hardware threads to change from the wait state to the ephemeral run state than are available in the wait state or that are allowed, based on predefined rules, to change at a given time. In this way, the hardware processor opcode effectively creates as many child hardware threads as are available, up to the maximum requested number, while informing the hardware thread originally executing the hardware processor opcode of the actual number of child hardware threads created.

The method of FIG. 3 also includes setting (314), by the hardware processor opcode (102) for the parent hardware thread (120), a flag (110) identifying the parent hardware thread (120) as a parent. The flag enables a thread to efficiently—quickly and with low computational overhead—determine the characterization of a hardware thread, whether parent or child. The flag, for example, may be implemented as a bit in a condition code register, which may be efficiently compared directly by hardware.

Figure 4:
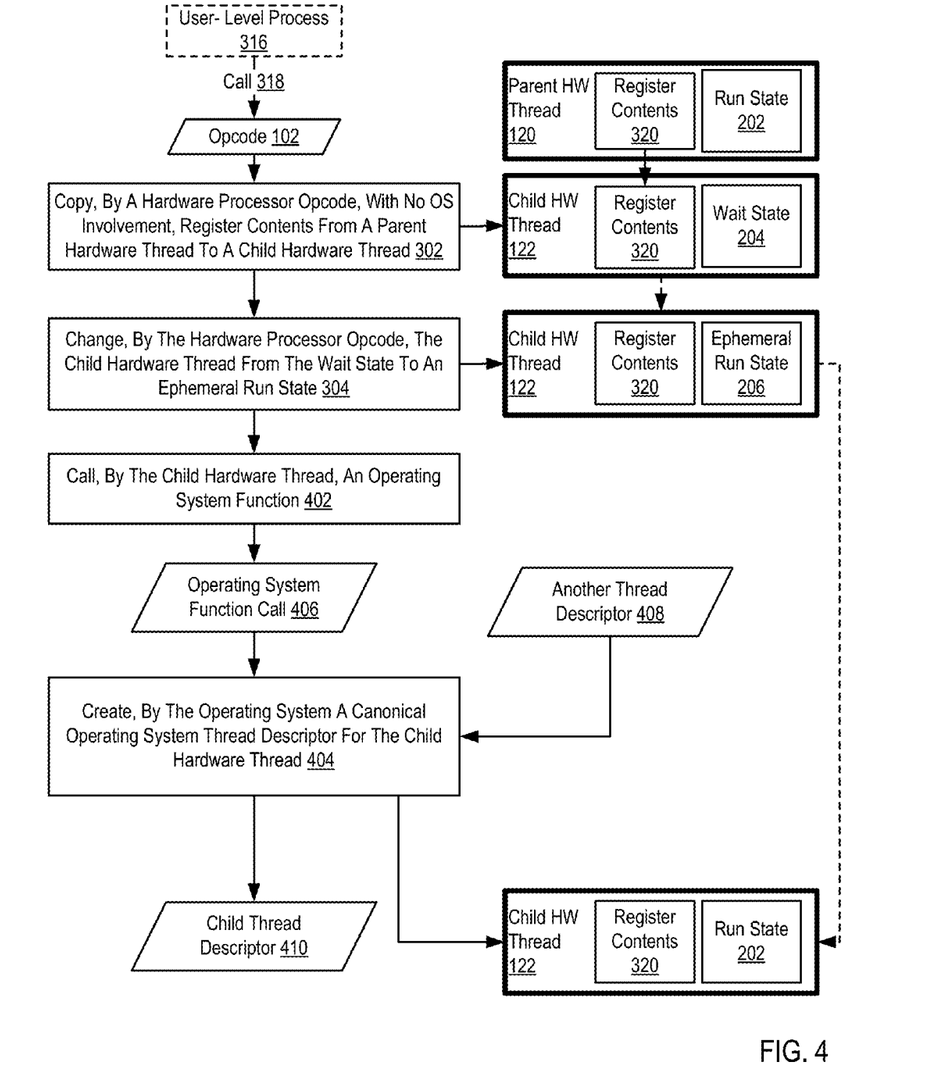
FIG. 4 sets forth a flow chart illustrating a further exemplary method for creating a thread of execution in a computer processor according to embodiments of the present invention.

As explained above with respect to FIG. 2, a child hardware thread, once in the ephemeral run state (206) may exit the state and return to a run state (202) under several different circumstances. These circumstances are described below in further detail with regard to FIGS. 4, 5, and 6. FIG. 4, therefore, sets forth a flow chart illustrating a further exemplary method for creating a thread of execution in a computer processor according to embodiments of the present invention. The method of FIG. 4 is similar to the method of FIG. 3, in that the method of FIG. 4 includes copying (302), by a hardware processor opcode (102) called (318) by a user-level process (316), with no operating system involvement, register contents (320) from a parent hardware thread (120) to a child hardware thread (122), the child hardware thread (122) being in a wait state (204); and changing (304), by the hardware processor opcode (102), the child hardware thread (122) from the wait state (204) to an ephemeral run state (206).

The method of FIG. 4, differs from the method of FIG. 3, however, in that the method of FIG. 4 includes calling (402), by the child hardware thread, an operating system function (406) and creating (404), by the operating system (404), a canonical operating system thread descriptor (410) for the child hardware thread (122). The operating system (404) may create the child's canonical operating system thread descriptor (410) from another operating system thread descriptor (408), such as a thread descriptor of a software thread executing in the parent hardware thread (120).

As explained above a canonical thread descriptor (410) is an operating system's description of a software thread of execution, its resources, memory space, current variable values, context, and so on as will occur to readers of skill in the art. Prior to creating a canonical thread descriptor (410) for the child hardware thread (122), the operating system has no knowledge that the child hardware thread is executing instructions. By creating a canonical thread descriptor, the child hardware thread—and the software thread executing within the hardware thread—effectively matures into a full-blow, operating system acknowledged, maintained, and administered, thread of execution.

Figure 5:
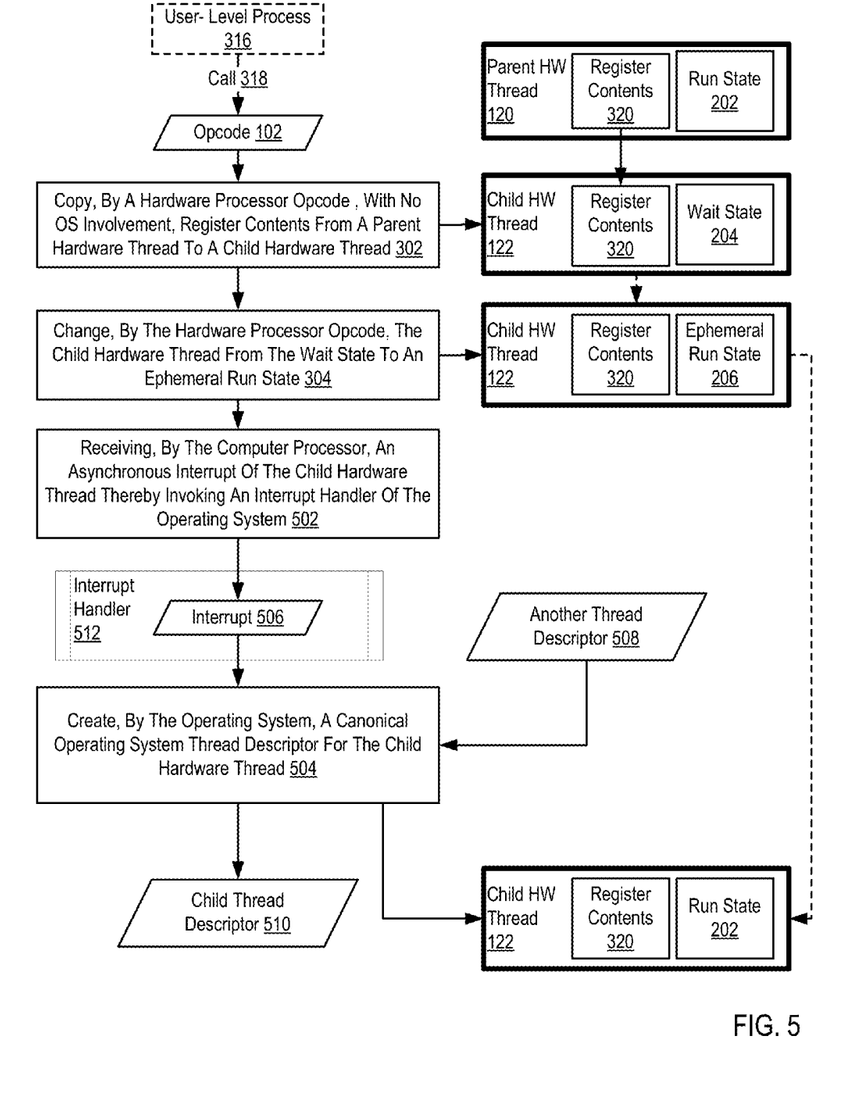
FIG. 5 sets forth a flow chart illustrating a further exemplary method for creating a thread of execution in a computer processor according to embodiments of the present invention.

For further explanation, FIG. 5 sets forth a flow chart illustrating a further exemplary method for creating a thread of execution in a computer processor according to embodiments of the present invention. The method of FIG. 5 is similar to the method of FIG. 3, in that the method of FIG. 5 includes copying (302), by a hardware processor opcode (102) called (318) by a user-level process (316), with no operating system involvement, register contents (320) from a parent hardware thread (120) to a child hardware thread (122), the child hardware thread (122) being in a wait state (204); and changing (304), by the hardware processor opcode (102), the child hardware thread (122) from the wait state (204) to an ephemeral run state (206).

The method of FIG. 5, differs from the method of FIG. 3, however, in that the method of FIG. 5 includes receiving (502), by the computer processor, an asynchronous interrupt (506) of the child hardware thread (122) thereby invoking an interrupt handler (512) of the operating system and creating (504), by the operating system, a canonical operating system thread descriptor (510) for the child hardware thread (122). The operating system may create the child's canonical operating system thread descriptor (510) from another operating system thread descriptor (508). Examples of such asynchronous interrupts (506) may include a quant timeout, a timer interrupt, an external interrupt unrelated to the child hardware thread that causes the OS to return the child hardware thread to a run state (202), an inter-processor interrupts such as an unexpected message from another processor, and so on as will occur to readers of skill in the art.

Figure 6:
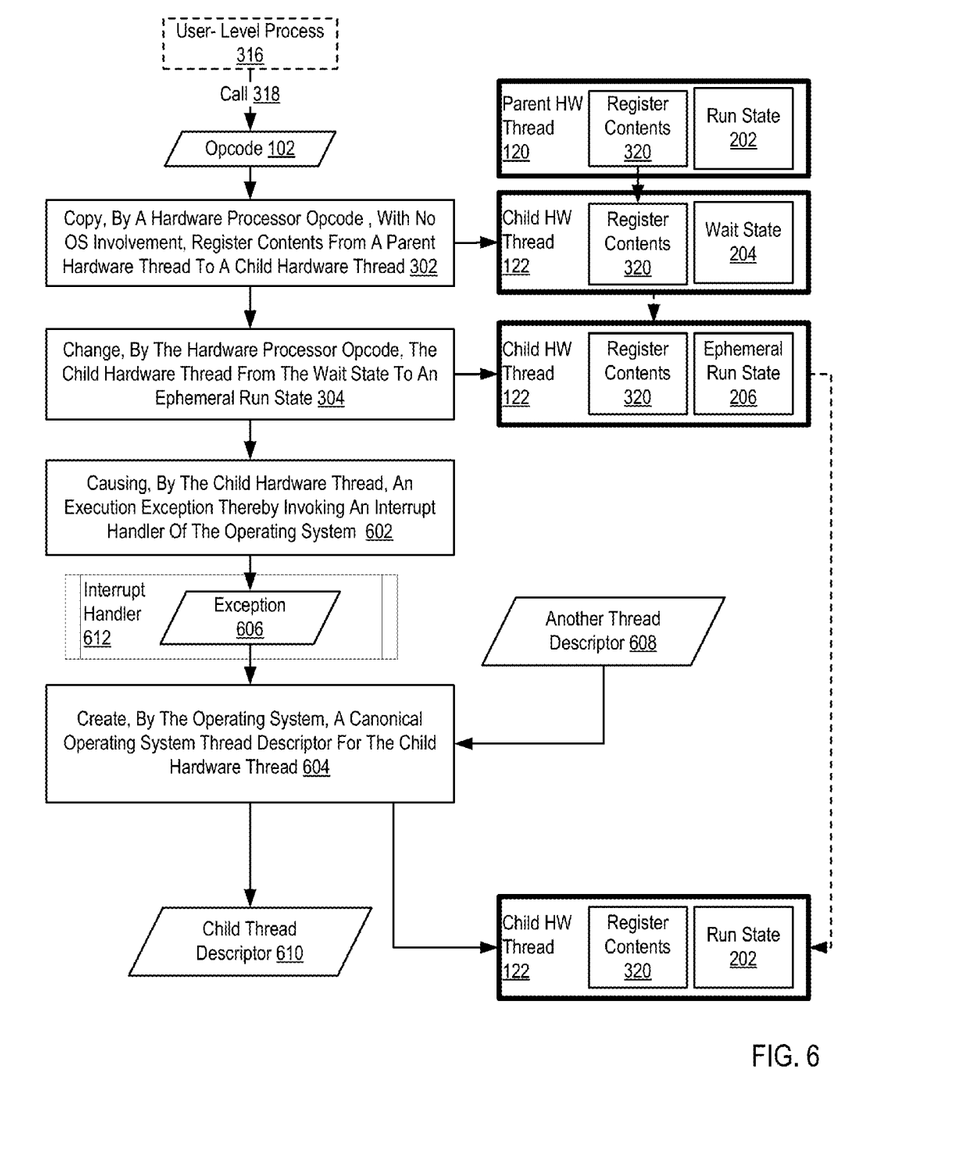
FIG. 6 sets forth a flow chart illustrating a further exemplary method for creating a thread of execution in a computer processor according to embodiments of the present invention.

For further explanation, FIG. 6 sets forth a flow chart illustrating a further exemplary method for creating a thread of execution in a computer processor according to embodiments of the present invention. The method of FIG. 6 is similar to the method of FIG. 3, in that the method of FIG. 6 includes copying (302), by a hardware processor opcode (102) called (318) by a user-level process (316), with no operating system involvement, register contents (320) from a parent hardware thread (120) to a child hardware thread (122), the child hardware thread (122) being in a wait state (204); and changing (304), by the hardware processor opcode (102), the child hardware thread (122) from the wait state (204) to an ephemeral run state (206).

The method of FIG. 6, differs from the method of FIG. 3, however, in that the method of FIG. 6 includes causing (602), by the child hardware thread (122), an execution exception (606) thereby invoking an interrupt handler (612) of the operating system and creating (604), by the operating system, a canonical operating system thread descriptor (610) for the child hardware thread (122). The operating system may create (604) the child's canonical operating system thread descriptor from another operating system thread descriptor (608). Examples of execution exceptions (606) may include a memory fault, execution of an illegal instruction, a division by zero, and so on as will occur to readers of skill in the art.

FIGS. 4, 5, 6, set forth various ways in which a child hardware thread may be changed from the ephemeral run state (206) to the run state (202). A child hardware thread configured in accordance with embodiments of the present invention, however, may also change from an ephemeral run state (206) to a wait state (204). For further explanation therefore, FIG. 7 sets forth a flow chart illustrating a further exemplary method for creating a thread of execution in a computer processor according to embodiments of the present invention. The method of FIG. 7 is similar to the method of FIG. 3, in that the method of FIG. 7 includes copying (302), by a hardware processor opcode (102) called (318) by a user-level process (316), with no operating system involvement, register contents (320) from a parent hardware thread (120) to a child hardware thread (122), the child hardware thread (122) being in a wait state (204); and changing (304), by the hardware processor opcode (102), the child hardware thread (122) from the wait state (204) to an ephemeral run state (206).

Figure 7:
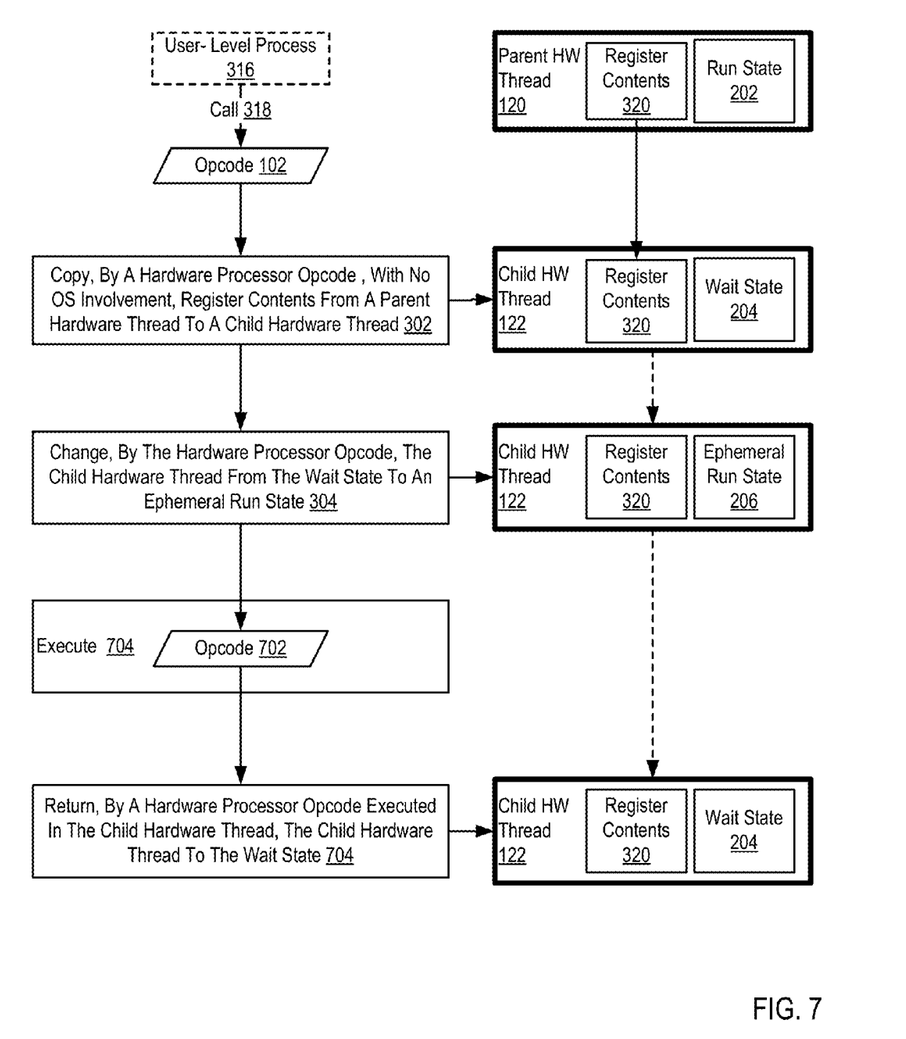
FIG. 7 sets forth a flow chart illustrating a further exemplary method for creating a thread of execution in a computer processor according to embodiments of the present invention.

The method of FIG. 7 differs from the method of FIG. 3, however, in that the method of FIG. 7 includes executing (704) a hardware processor opcode (702) in the child hardware thread and returning (704), by the hardware processor opcode executed in the child hardware thread (122), the child hardware thread to the wait state (204). That is, in addition to a hardware processor opcode executed in parent thread that changes a state of a child thread from a wait state to an ephemeral state, the method of FIG. 7 also includes a hardware processor opcode executed in the child thread that the changes the state of the child thread from the ephemeral state back to the wait state. In this way, at the hardware processor opcode level, without operating system interaction, a thread of execution may be created in an available hardware thread (a hardware thread in the wait state), executed in the hardware thread, and the hardware thread may be returned to the wait state for future availability.

In view of the explanations set forth above, readers will recognize that the benefits of creating a thread of execution in a computer processor according to embodiments of the present invention include:

Thread creation of a single thread is extremely lightweight, involving no operating system overhead.

Thread creation of many threads may be carried out in parallel and on demand, rather than serially for each of the many thread; and Thread creation occurs in the same amount of computer time to create any number of child threads.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for creating a thread of execution in a computer processor, the apparatus comprising a computer processor, a computer memory operatively coupled to the computer processor, the computer memory having disposed within it computer program instructions that, when executed by the computer processor, cause the computer processor to:
   copy, as indicated by a hardware processor opcode, the hardware processor opcode having been specified by a user-level process, data from a first set of registers to a second set of registers, wherein the first set of registers is associated with a parent hardware thread, wherein the second set of registers is associated with a child hardware thread, wherein the first set of registers and the second set of registers are located on the computer processor, wherein the child hardware thread is in a wait state; and
   change, as indicated by the hardware processor opcode, the child hardware thread from the wait state to an ephemeral run state, wherein the ephemeral run state indicates a lack of operating system support structures for the child hardware thread.

2. The apparatus of claim 1 further comprising computer program instructions that, when executed by the computer processor, cause the computer processor to:
   call, by the child hardware thread, an operating system function; and
   create, by the operating system, a canonical operating system thread descriptor for the child hardware thread.

3. The apparatus of claim 1 further comprising computer program instructions that, when executed by the computer processor, cause the computer processor to:
   receive, by the computer processor, an asynchronous interrupt of the child hardware thread thereby invoking an interrupt handler of the operating system; and
   create, by the operating system, a canonical operating system thread descriptor for the child hardware thread.

4. The apparatus of claim 1 further comprising computer program instructions that, when executed by the computer processor, cause the computer processor to:
   generate, by the child hardware thread, an execution exception that invokes an interrupt handler of the operating system; and
   create, by the operating system, a canonical operating system thread descriptor for the child hardware thread.

5. The apparatus of claim 1 wherein the hardware processor opcode further comprises an operand specifying a maximum number of child hardware threads to change from the wait state to the ephemeral run state, and the apparatus further comprises computer program instructions that, when executed by the computer processor, cause the computer processor to return, as indicated by the hardware processor opcode to the user-level process, a number of child hardware threads changed from the wait state to the ephemeral run state.

6. The apparatus of claim 1 further comprising computer program instructions that, when executed by the computer processor, cause the computer processor to set, as indicated by the hardware processor opcode for the parent hardware thread, a flag indicating whether any child hardware threads were changed from the wait state to the ephemeral run state.

7. The apparatus of claim 1 further comprising computer program instructions that, when executed by the computer processor, cause the computer processor to set, as indicated by the hardware processor opcode for the parent hardware thread, a flag identifying the parent hardware thread as a parent.

8. A computer program product for creating a thread of execution in a computer processor, the computer program product disposed upon a non-transitory computer readable storage medium, the computer program product comprising computer program instructions to:
  copy, as indicated by a hardware processor opcode, the hardware processor opcode having been specified by a user-level process, data from a first set of registers to a second set of registers, wherein the first set of registers is associated with a parent hardware thread, wherein the second set of registers is associated with a child hardware thread, wherein the first set of registers and the second set of registers are located on the computer processor, wherein the child hardware thread is in a wait state; and
  change, as indicated by the hardware processor opcode, the child hardware thread from the wait state to an ephemeral run state, wherein an the ephemeral run state indicates a lack of operating system support structures for the child hardware thread.

9. The computer program product of claim 8 further comprising computer program instructions to:
  call, by the child hardware thread, an operating system function; and
  create, by the operating system, a canonical operating system thread descriptor for the child hardware thread.

10. The computer program product of claim 8 further comprising computer program instructions to:
  receive, by the computer processor, an asynchronous interrupt of the child hardware thread thereby invoking an interrupt handler of the operating system; and
  create, by the operating system, a canonical operating system thread descriptor for the child hardware thread.

11. The computer program product of claim 8 further comprising computer program instructions to:
  generate, by the child hardware thread, an execution exception thereby invoking an interrupt handler of the operating system; and
  create, by the operating system, a canonical operating system thread descriptor for the child hardware thread.

12. The computer program product of claim 8 wherein the hardware processor opcode further comprises an operand specifying a maximum number of child hardware threads to change from the wait state to the ephemeral run state, and the apparatus further comprises computer program instructions to return, as indicated by the hardware processor opcode to the user-level process, a number of child hardware threads changed from the wait state to the ephemeral run state.

13. The computer program product of claim 8 further comprising computer program instructions to set, as indicated by the hardware processor opcode for the parent hardware thread, a flag indicating whether any child hardware threads were changed from the wait state to the ephemeral run state.

14. The computer program product of claim 8 further comprising computer program instructions to set, as indicated by the hardware processor opcode for the parent hardware thread, a flag identifying the parent hardware thread as a parent.

\* \* \* \* \*